United States Patent
Yoshida

(10) Patent No.: US 10,291,826 B2
(45) Date of Patent: May 14, 2019

(54) IMAGE PROCESSING APPARATUS, IMAGE PROCESSING METHOD, AND COMPUTER PROGRAM PRODUCT

(71) Applicant: Atsushi Yoshida, Kanagawa (JP)

(72) Inventor: Atsushi Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/839,477

(22) Filed: Dec. 12, 2017

(65) Prior Publication Data

US 2018/0198958 A1    Jul. 12, 2018

(30) Foreign Application Priority Data

Jan. 11, 2017    (JP) .................................. 2017-002705

(51) Int. Cl.
*H04N 1/60*    (2006.01)
*G06K 15/14*    (2006.01)
*G06K 15/12*    (2006.01)

(52) U.S. Cl.
CPC ......... *H04N 1/6033* (2013.01); *G06K 15/129* (2013.01); *G06K 15/14* (2013.01); *H04N 1/6005* (2013.01); *H04N 1/6008* (2013.01); *H04N 1/6038* (2013.01)

(58) Field of Classification Search
CPC .. H04N 1/6033; H04N 1/6038; H04N 1/6005; H04N 1/6008; G06K 15/129; G06K 15/14
See application file for complete search history.

(56) References Cited

U.S. PATENT DOCUMENTS

| | | |
|---|---|---|
| 2009/0225340 A1 | 9/2009 | Hatori |
| 2011/0176153 A1 | 7/2011 | Hoshino |
| 2011/0292417 A1 | 12/2011 | Miyagi |

FOREIGN PATENT DOCUMENTS

| | | |
|---|---|---|
| EP | 2530926 A2 | 12/2012 |
| JP | 2009-212839 | 9/2009 |
| JP | 2012-015993 | 1/2012 |

OTHER PUBLICATIONS

European Search Report; Application 18150775.7-1209; dated May 16, 2018.

*Primary Examiner* — Christopher Wait
(74) *Attorney, Agent, or Firm* — Duft & Bornsen, PC

(57) ABSTRACT

An image processing apparatus includes a processor including a setting unit to assign a correction control point to a first color-space value dependent on a first output device and a color chart generator to convert the first color-space value to which the correction control point is assigned into a second color-space value dependent on a second output device, displace the second color-space value, convert a displaced second color-space value into a displaced first color-space value, and generate a color chart including a patch generated based on the displaced first color-space value; an image forming device to output the color chart; and a colorimeter to perform colorimetry of the color chart. The processor further includes a correction parameter generator to generate a correction parameter to correct an output profile with a colorimetric value by the colorimeter, and an output profile correction unit to correct the output profile using the correction parameter.

10 Claims, 15 Drawing Sheets

| ID | C | M | Y | K |
|---|---|---|---|---|
| 0 | 0 | 0 | 0 | 0 |
| 1 | 0 | 0 | 64 | 0 |
| 2 | 0 | 0 | 128 | 0 |
| 3 | 0 | 0 | 192 | 0 |
| 4 | 0 | 0 | 255 | 0 |
| 5 | 0 | 64 | 64 | 0 |
| 6 | 0 | 128 | 128 | 0 |
| ... | ... | ... | ... | ... |
| n-1 | 255 | 255 | 192 | 0 |
| n | 255 | 255 | 255 | 0 |

| PATCH NO. | H | S | L | K |
|---|---|---|---|---|
| 0 | H0 | S0 | L0 | K0 |
| 1 | H0−α | S0 | L0 | K0 |
| 2 | H0+α | S0 | L0 | K0 |
| 3 | H0 | S0+β | L0 | K0 |
| 4 | H0 | S0−β | L0 | K0 |

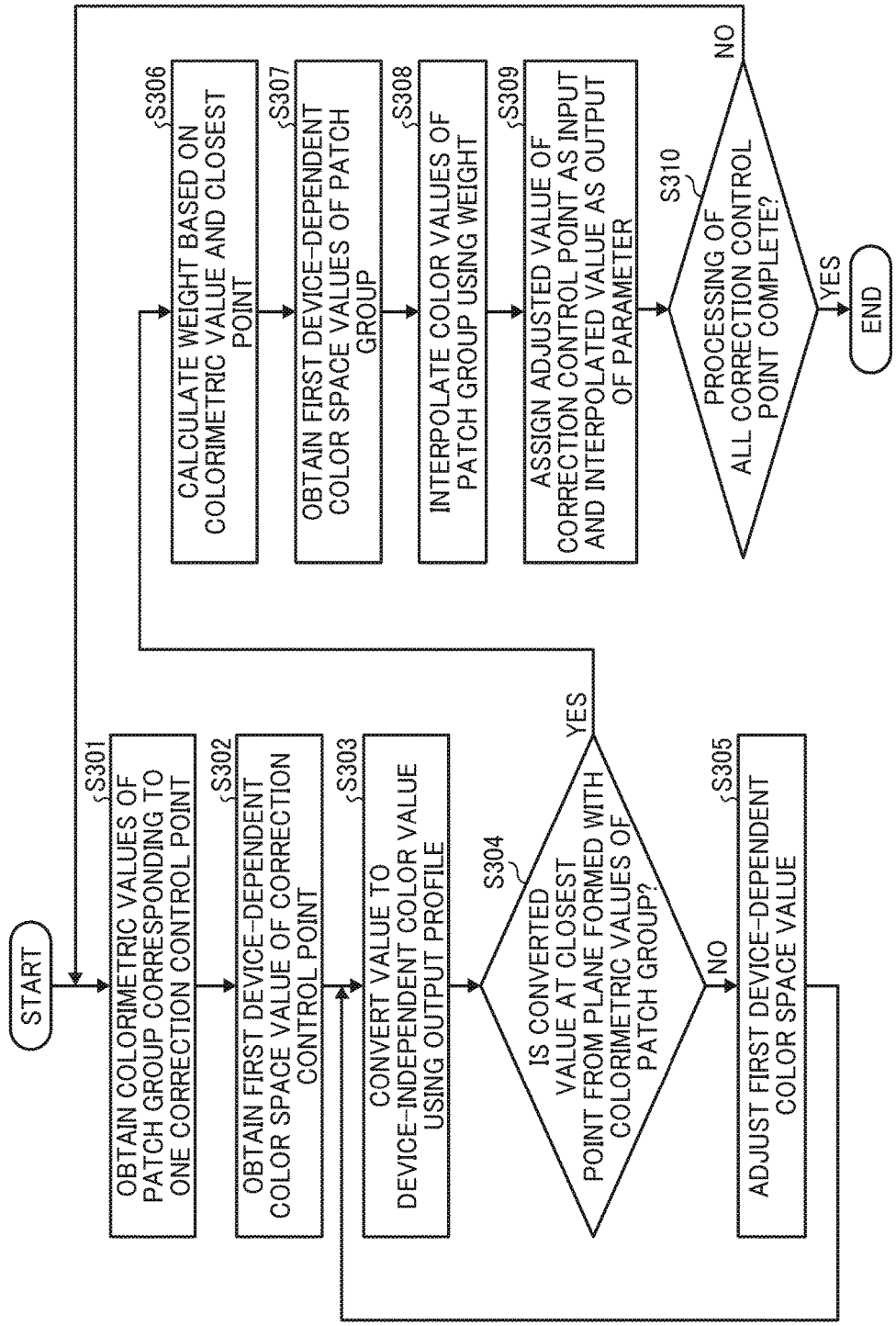

FIG. 10

| ID | INPUT | | | | OUTPUT | | | |
|---|---|---|---|---|---|---|---|---|
| | C | M | Y | K | C | M | Y | K |
| 0 | 0 | 0 | 0 | 0 | 0 | 0 | 0 | 0 |
| 1 | 0 | 0 | 72 | 0 | 0 | 1 | 67 | 0 |
| 2 | 0 | 0 | 129 | 0 | 0 | 4 | 135 | 0 |
| 3 | 0 | 0 | 199 | 0 | 0 | 2 | 202 | 0 |
| 4 | 0 | 0 | 255 | 0 | 0 | 0 | 255 | 0 |
| 5 | 0 | 58 | 66 | 0 | 0 | 64 | 61 | 0 |
| 6 | 0 | 125 | 128 | 0 | 0 | 122 | 121 | 0 |
| ... | ... | ... | ... | ... | ... | ... | ... | ... |
| n−1 | 255 | 255 | 198 | 0 | 255 | 255 | 199 | 0 |
| n | 255 | 255 | 255 | 0 | 255 | 255 | 255 | 0 |

FIG. 14
| PATCH NO. | C | M | Y | K |
|---|---|---|---|---|
| 0 | C0 | M0 | Y0 | K0 |
| 1 | C0 | M0-α | Y0+α | K0 |
| 2 | C0 | M0 | Y0+α | K0 |
| 3 | C0 | M0+α | Y0+α | K0 |
| 4 | C0 | M0-α | Y0 | K0 |
| 5 | C0 | M0+α | Y0 | K0 |
| 6 | C0 | M0-α | Y0-α | K0 |
| 7 | C0 | M0 | Y0-α | K0 |
| 8 | C0 | M0+α | Y0-α | K0 |
FIG. 15A
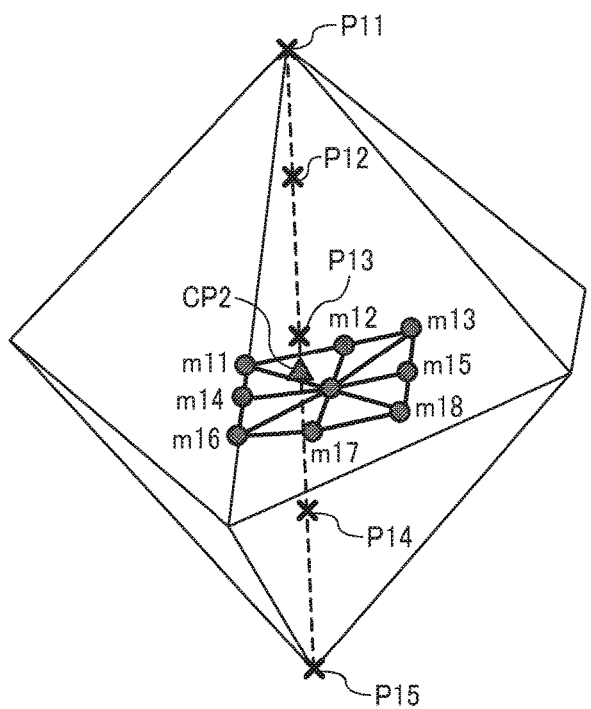
FIG. 15B
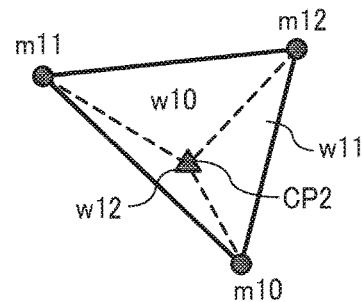

| Max-Min | H | S |
|---|---|---|
| 0 | 0.10 | 0.40 |
| 64 | 0.08 | 0.35 |
| 128 | 0.07 | 0.30 |
| 192 | 0.06 | 0.25 |
| 255 | 0.05 | 0.20 |

IMAGE PROCESSING APPARATUS, IMAGE PROCESSING METHOD, AND COMPUTER PROGRAM PRODUCT

CROSS-REFERENCE TO RELATED APPLICATIONS

This patent application is based on and claims priority pursuant to 35 U.S.C. § 119(a) to Japanese Patent Application No. 2017-002705, filed on Jan. 11, 2017, in the Japan Patent Office, the entire disclosure of which is hereby incorporated by reference herein.

BACKGROUND

Technical Field

The present disclosure relates to an image processing apparatus, an image processing method, and a recording medium storing a program for causing a computer to execute the image processing method.

Description of the Related Art

A color management technique is known that provides color matching between a plurality of devices via a common color space using a profile (e.g., International Color Consortium (ICC)) profile) that describes a correspondence between a color space dependent on a particular device (e.g., CMYK or RGB color space) and a common color space independent of device (e.g., CIELAB color space).

For example, when an image is to be printed using an image forming apparatus, the color space of source data is converted into a common color space using an input profile, and the resultant color space is further converted into a color space specific to that image forming apparatus using an output profile. The source data after this conversion is then processed to have a color gamut restricted to a print color gamut reproducible by the image forming apparatus, after which the image is printed.

Another known color management technique is to use calibration for color stabilization of an image forming apparatus. One conventional calibration technique is known that outputs a single-color patch (patch formed of a single color) having multiple tones (e.g., CMYK), performs colorimetry on this patch, and uses the values obtained by the colorimetry to correct the gamma curve so that the predetermined gradation value matches the desired color. However, it is becoming known that correction of a gamma curve based on colorimetry of a single-color patch may not be successful in color reproduction of a mixed color.

Thus, a technique is already known that outputs a mixed-color patch (patch formed by addition of a plurality of single colors; also referred to as "color patch"), instead of a single-color patch, performs colorimetry on the mixed-color patch, and uses the values obtained by the colorimetry to correct a color conversion table or a profile so that a color generated by addition of particular gradations matches the desired color.

SUMMARY

According to an embodiment of this disclosure provides an image processing apparatus that includes a processor, an image forming device, and a colorimeter. The processor includes a correction control point setting unit configured to assign a correction control point to a first color-space value in a first color space dependent on a first output device; and a color chart generator configured to convert the first color-space value to which the correction control point is assigned into a second color-space value in a second color space dependent on a second output device, displace the second color-space value by a predetermined amount, convert the displaced second color-space value into a displaced first color-space value in the first color space, and generate a color chart including a plurality of patches including a displaced-value patch generated based on the displaced first color-space value. The image forming device outputs the color chart, and the colorimeter performs colorimetry of the plurality of patches of the color chart. The processor further includes a correction parameter generator configured to generate a correction parameter to correct an output profile with a colorimetric value generated by the colorimeter, and an output profile correction unit to correct the output profile using the correction parameter.

Another embodiment provides an image processing method that includes assigning a correction control point to a first color-space value in a first color space dependent on a first output device; converting the first color-space value to which the correction control point is assigned into a second color-space value in a second color space dependent on a second output device; displacing the second color-space value by a predetermined amount; converting the displaced second color-space value into a displaced first color-space value in the first color space; generating a color chart including a plurality of patches including a displaced-value patch generated based on the displaced first color-space value; outputting the color chart; performing colorimetry of the plurality of patches of the color chart; generating a correction parameter to correct an output profile with a colorimetric value generated by the colorimeter; and correcting the output profile using the correction parameter.

Another embodiment provides a non-transitory recording medium storing program codes which, when executed by at least one processor, cause the processor to execute the method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is a flowchart illustrating an example of a correction parameter generation process;

FIG. 10 is a chart illustrating an example of correction parameter;

FIG. 14 is a chart illustrating an example of correction patch group corresponding to one correction control point in an achromatic range;

FIGS. 15A and 15B are schematic views of the L*a*b* color space and a partial enlarged view of the L*a*b* color space;

Figure 1:
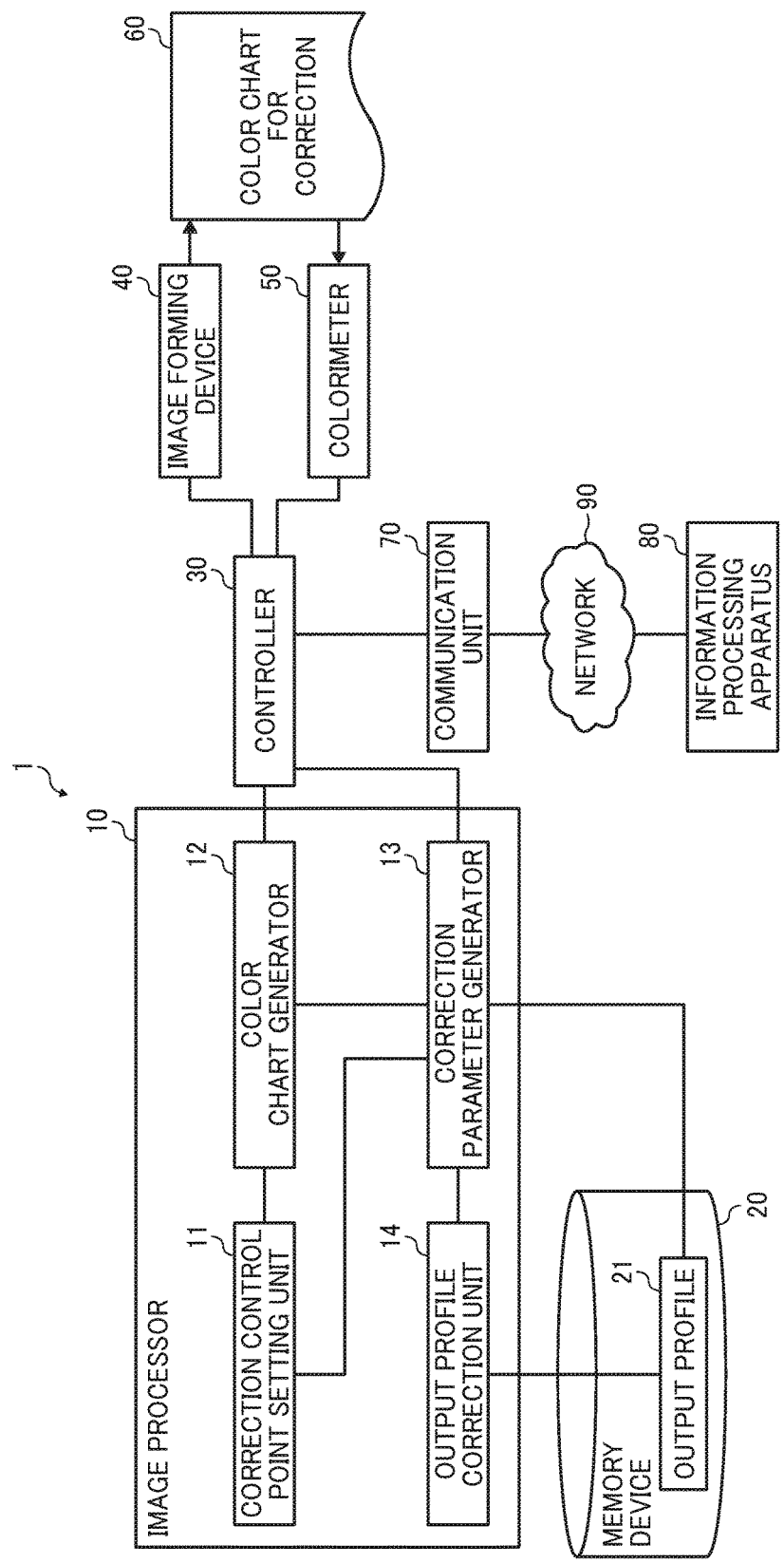
FIG. 1 is a block diagram schematically illustrating an example configuration of an image processing apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an image processing apparatus according to an embodiment of this disclosure is described. As used herein, the singular forms "a", "an", and "the" are intended to include the plural forms as well, unless the context clearly indicates otherwise.

Embodiment 1

The present embodiment provides an image processing apparatus that includes a correction control point setting unit (correction control point setting unit 11) to assign a correction control point to a color value (e.g., CMYK value) in a first device-dependent color space (e.g., CMYK color space) of an output device (the color value hereinafter referred to simply as "first device-dependent color value"); a color chart generator (color chart generator 12) to convert the first device-dependent color value to which the correction control point has been assigned, into a color value (e.g., HSL value) in a second device-dependent color space (e.g., HSL color space) of the output device, different from the first device-dependent color space (the color value hereinafter referred to simply as "second device-dependent color value"), and then to change the second device-dependent color value by a predetermined amount to generate a color chart (color chart 60 for correction) containing a patch generated based on a color value in the first device-dependent color space, resultant from conversion from the second device-dependent color value after the change; an image forming device (image forming device 40) to output the color chart; a colorimeter (colorimeter 50) to perform colorimetry on the patch contained in the color chart output; a correction parameter generator (correction parameter generator 13) to generate a correction parameter for correcting an output profile (output profile 21) using a colorimetric value obtained by the colorimeter; and an output profile correction unit (output profile correction unit 14) to correct the output profile using the correction parameter. The foregoing designations given in parentheses are examples of names and symbols used in the described embodiments.

Structure of Image Processing Apparatus

FIG. 1 is a block diagram schematically illustrating a structure of an image processing apparatus according to Embodiment 1. The image processing apparatus 1 includes an image processor 10, a memory device 20, a controller 30, an image forming device 40, a colorimeter 50, and a communication unit 70. FIG. 1 also illustrates an information processing apparatus 80 that can be communicatively connected to the communication unit 70 of the image processing apparatus 1 via a network 90.

The image processor 10 includes a control device, such as a central processing unit (CPU), and a memory, such as a random access memory (RAM). Upon activation, the image processor 10 loads a program stored in the memory device 20 to the RAM, serving as the main memory, to implement functions of the function units described below. The RAM is also used as a work area for temporarily storing various data, such as results of computation by a component in the image processing apparatus 1. Alternatively, the above-described program can be provided, for the image processing apparatus 1, as files being in an installable format or an executable format and stored in a computer-readable recording medium, such as a compact disc read only memory (CD-ROM), a flexible disk (FD), a compact disc recordable (CD-R), and a digital versatile disk (DVD). The above-described program can be stored on a computer connected to a network such as the Internet so that the program is provided or distributed via the network.

The image processor 10 includes a correction control point setting unit 11, a color chart generator 12, a correction parameter generator 13, and an output profile correction unit 14. The image processor 10 generates output data of a color chart 60 for correction to be printed by the image forming device 40, and corrects an output profile 21 stored in the memory device 20.

The correction control point setting unit 11 assigns a set of correction control points to be used in generation of the color chart 60 for correction by the color chart generator 12, and in generation of a correction parameter by the correction parameter generator 13. Details of correction control point will be described later herein with reference to FIG. 3.

The color chart generator 12 generates the color chart 60 for correction based on the correction control points assigned by the correction control point setting unit 11. The configuration of, and the process performed by, the color chart generator 12 will be described later herein with reference to FIGS. 4 to 7.

The correction parameter generator 13 generates the correction parameter for correcting the output profile 21, using information such as the correction control points, a patch arrangement in the color chart 60 for correction, colorimetric values in the color chart 60 for correction, and the output profile 21. The process performed by the correction parameter generator 13 will be described later herein with reference to FIGS. 8 to 10.

The output profile correction unit 14 corrects the output profile 21 using the correction parameter generated by the correction parameter generator 13. The process performed by the output profile correction unit 14 will be described later herein with reference to FIG. 11.

For example, the memory device 20 includes a read only memory (ROM), a nonvolatile RAM (NVRAM), and a hard disk drive (HDD). The memory device 20 stores the output profile 21, various programs, various parameter values for use in the process for correcting the output profile 21, and various data.

The controller 30 is a control unit that controls the entirety of the image processing apparatus 1 and the devices connected to the controller 30. A part of or the entire controller can be implemented by software to cause a processor such as a CPU to execute the program. Alternatively, part of or the entire controller 30 can be implemented hardware such as an integrated circuit (IC), or a combination of software and hardware. In one embodiment, a part of the controller 30 is configured as a part of the image processor 10.

The image forming device 40 functions as a printer engine, controlled by the controller 30, which prints an image on a recording medium using output data received from the controller 30. The image forming device 40 receives the output data of the color chart 60 for correction generated by the color chart generator 12 via the controller 30, and prints the color chart 60 for correction.

The image formation technique used by the image forming device 40 can be electrophotographic or inkjet printing, and is not particularly limited. The image forming device 40 prints an image on a recording medium using, for example, toners or inks respectively of cyan (C), magenta (M), yellow (Y), and key plate (K) colors.

The colorimeter 50 is controlled by the controller 30, and performs colorimetry on each patch contained in the color chart 60 for correction printed by the image forming device 40.

The communication unit 70 communicates with other devices via the network 90. In the example illustrated in FIG. 1, the communication unit 70 can exchange data with the information processing apparatus 80 via the network 90. The communication unit 70, for example, sends various data and various signals to the information processing apparatus 80, and receives print data from the information processing apparatus 80. The communication unit 70 can also generate and correct the output profile 21 in response to an instruction from the information processing apparatus 80.

Process Flow of Image Processing Apparatus

Figure 2:
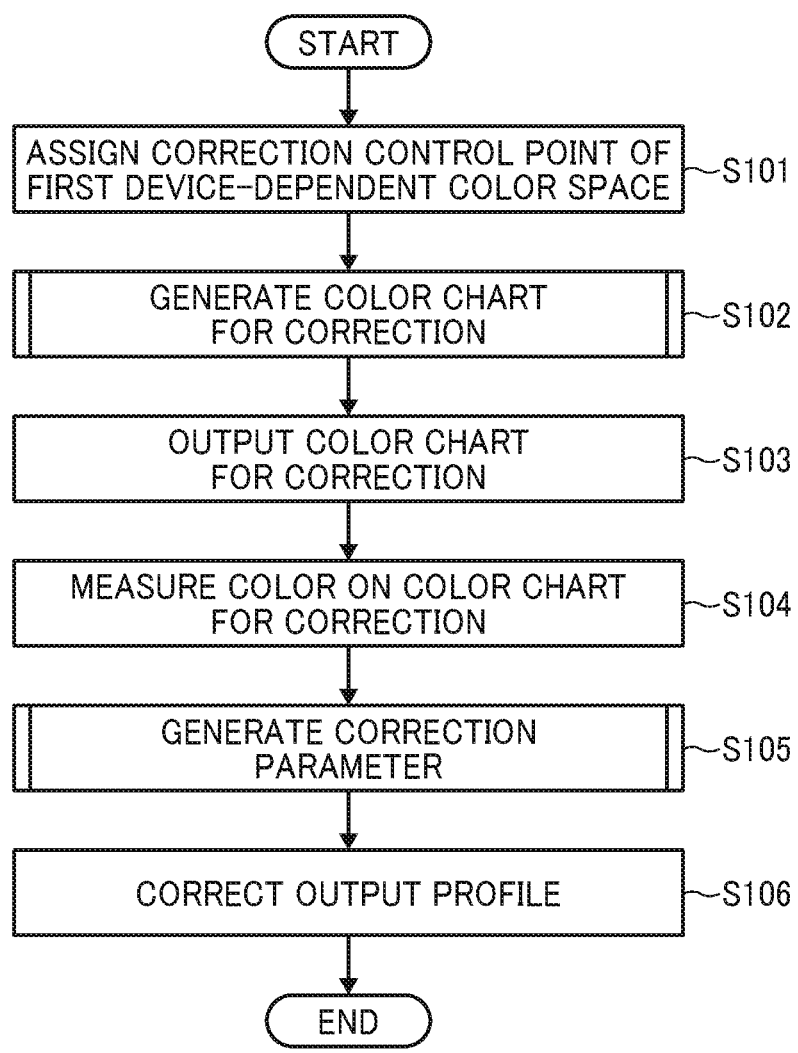
FIG. 2 is a flowchart illustrating an example of a process performed by the image processing apparatus illustrated in FIG. 1.

FIG. 2 is a flowchart illustrating an example of a process performed by the image processing apparatus 1. The general flow of the process performed by the image processing apparatus 1 will first be described referring to the flowchart of FIG. 2, and then each step will be described in more detail.

At S101, the correction control point setting unit 11 of the image processor 10 assigns a set of correction control points in a first device-dependent color space (e.g., CMYK color space).

At step S102, the color chart generator 12 generates the color chart 60 for correction based on the correction control points assigned, and then outputs the data of the color chart 60 for correction to the controller 30.

At step S103, the image forming device 40 outputs the color chart 60 for correction based on the data received from the controller 30.

At step S104, the colorimeter 50 measures color, that is, performs colorimetry, on the color chart 60 for correction that has been output.

At step S105, the correction parameter generator 13 generates the correction parameter for correcting the output profile 21, based on the correction control points, a patch arrangement in the color chart 60 for correction, colorimetric values of the color chart 60 for correction, and the output profile 21.

At step S106, the output profile correction unit 14 corrects the output profile 21 using the correction parameter generated.

Correction Control Point Setting Unit

Figures 3, 4:
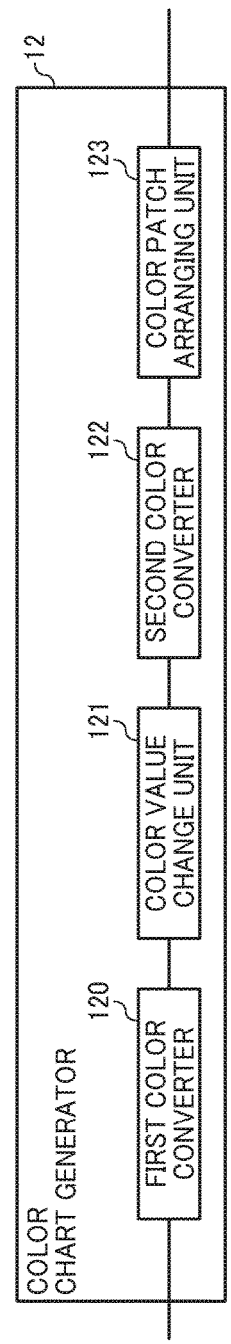
FIG. 3 is a chart illustrating an example of correction control points.
FIG. 4 is a block diagram illustrating a configuration of a color chart generator according to an embodiment.

The correction control point setting unit 11 will be described in detail below. FIG. 3 is a chart illustrating an example of correction control points. The correction control point setting unit 11 assigns the correction control points for correcting the output profile 21 such that gradation values are successively changed in an appropriate hue. Correction control points are assigned mainly to a set of typical hues, including primary colors such as CMY, secondary colors such as RGB, and tertiary colors such as gray.

FIG. 3 illustrates an example set of correction control points (ID0 to IDn) that are assigned to CMK values of CMYK values. For example, the correction control points ID0 to ID4 are correction control points for correcting a color of Y hue, and are thus assigned such that the gradation values of C and M components remain constant, while the gradation values of Y component are changed from 0 to 64, 128, 192, and 255.

Color Chart Generator

The color chart generator 12 will next be described in detail below. FIG. 4 is a block diagram illustrating a detailed configuration of the color chart generator 12. The color chart generator 12 includes a first color converter 120, a color value change unit 121 (a color value displacing unit), a second color converter 122, and a color patch arranging unit 123. The color chart generator 12 generates the color chart 60 for correction based on the correction control points assigned. This process is herein referred to as color chart generation process.

The first color converter 120 converts CMY values of CMYK values (i.e., first device-dependent color space values) to HSL (hue, saturation, and lightness or luminance) values (i.e., second device-dependent color space values).

The color value change unit 121 displaces, by a predetermined amount, the HSL values resultant from the conversion by the first color converter 120.

The second color converter 122 reversely converts the HSL values displaced by the color value change unit 121, into CMY values.

The color patch arranging unit 123 arranges, on a page, patches generated using the color value sets before and after the displacing made by the color value change unit 121 to generate the color chart 60 for correction.

Figure 5:
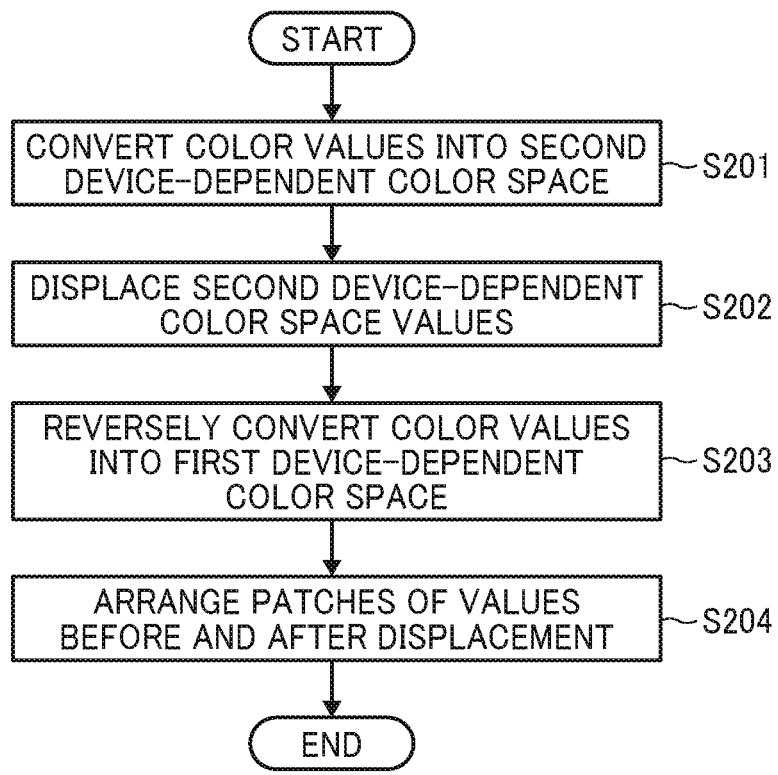
FIG. 5 is a flowchart illustrating an example of a color chart generation process.

FIG. 5 is a flowchart illustrating an example of the color chart generation process performed by the color chart generator 12.

The color chart generation process begins at step S201, where the first color converter 120 converts CMY values to HSL values (in the second device-dependent color space). The CMY values can be converted into the HSL values using equations 1 to 14 given in Formula 1. Note that the values of the C, M, and Y components range from 0 to 255.

Formula 1

$$C' = C/255 \quad \text{Equation 1}$$
$$M' = M/255 \quad \text{Equation 2}$$
$$Y' = Y/255 \quad \text{Equation 3}$$
$$R = 1.0 - C' \quad \text{Equation 4}$$
$$G = 1.0 - M' \quad \text{Equation 5}$$
$$B = 1.0 - Y' \quad \text{Equation 6}$$
$$\max = \text{Max}(C', M', Y') \quad \text{Equation 7}$$
$$\min = \text{Min}(C', M', Y') \quad \text{Equation 8}$$
$$L = (\max + \min)/2 \quad \text{Equation 9}$$
$$ds = \max - \min \quad \text{Equation 10}$$
$$S = \begin{cases} ds/(\max + \min), & L \le 0.5 \\ ds/(2 - \max - \min), & \text{else} \end{cases} \quad \text{Equation 11}$$
$$tmp(C', M', Y') = (\max - (C', M', Y'))/ds \quad \text{Equation 12}$$
$$h = \begin{cases} tmp(Y') - tmp(M'), & C' = \max \\ 2 + tmp(C') - tmp(Y'), & M' = \max \\ 4 + tmp(M') - tmp(C'), & Y' = \max \end{cases} \quad \text{Equation 13}$$
$$H = 60 * h \quad \text{Equation 14}$$

At step S202, the color value change unit 121 displaces (changes), by a predetermined value, the HSL values resultant from the conversion using the equations given in Formula 1 presented above. The predetermined value can be any value at or greater than a maximum variation of density of each colorant used in the printer that uses the output profile 21 to be corrected.

At step S203, the second color converter 122 reversely converts the HSL values that have been displaced at step S202 into CMY values (in the first device-dependent color space). The HSL values can be converted into the CMY values using equations 15 to 30 given in Formula 2. The value of K can remain the same as before.

Formula 2

$$\min = \begin{cases} L \times (1 + S), & L \le 0.5 \\ L + S - (L \times S), & \text{else} \end{cases} \quad \text{Equation 15}$$
$$\max = 2 \times L - \min \quad \text{Equation 16}$$
$$R = G = B = 0, \text{ if } S = 0 \quad \text{Equation 17}$$
$$H_r = H' + 120 \quad \text{Equation 18}$$
$$H_g = H' \quad \text{Equation 19}$$
$$H_b = H' - 120 \quad \text{Equation 20}$$
$$val(h) = \quad \text{Equation 21}$$
$$\begin{cases} \min + (\max - \min) \times h/60, & \text{if } h < 60 \\ \max, & \text{else if } h < 120 \\ \min + (\max - \min) \times (240 - h)/60, & \text{else if } h < 240 \\ \min, & \text{else} \end{cases}$$
$$R = val(H_r) \quad \text{Equation 22}$$
$$G = val(H_g) \quad \text{Equation 23}$$
$$B = val(H_b) \quad \text{Equation 24}$$
$$C' = 1.0 - R \quad \text{Equation 25}$$
$$M' = 1.0 - G \quad \text{Equation 26}$$
$$Y' = 1.0 - B \quad \text{Equation 27}$$
$$C = C' \times 255 \quad \text{Equation 28}$$
$$M = M' \times 255 \quad \text{Equation 29}$$
$$Y = Y' \times 255 \quad \text{Equation 30}$$

At step S204, the color patch arranging unit 123 arranges, on a page, patches generated using the color value sets before and after the displacing made by the color value change unit 121 to generate the color chart 60 for correction.

Figures 6, 7:
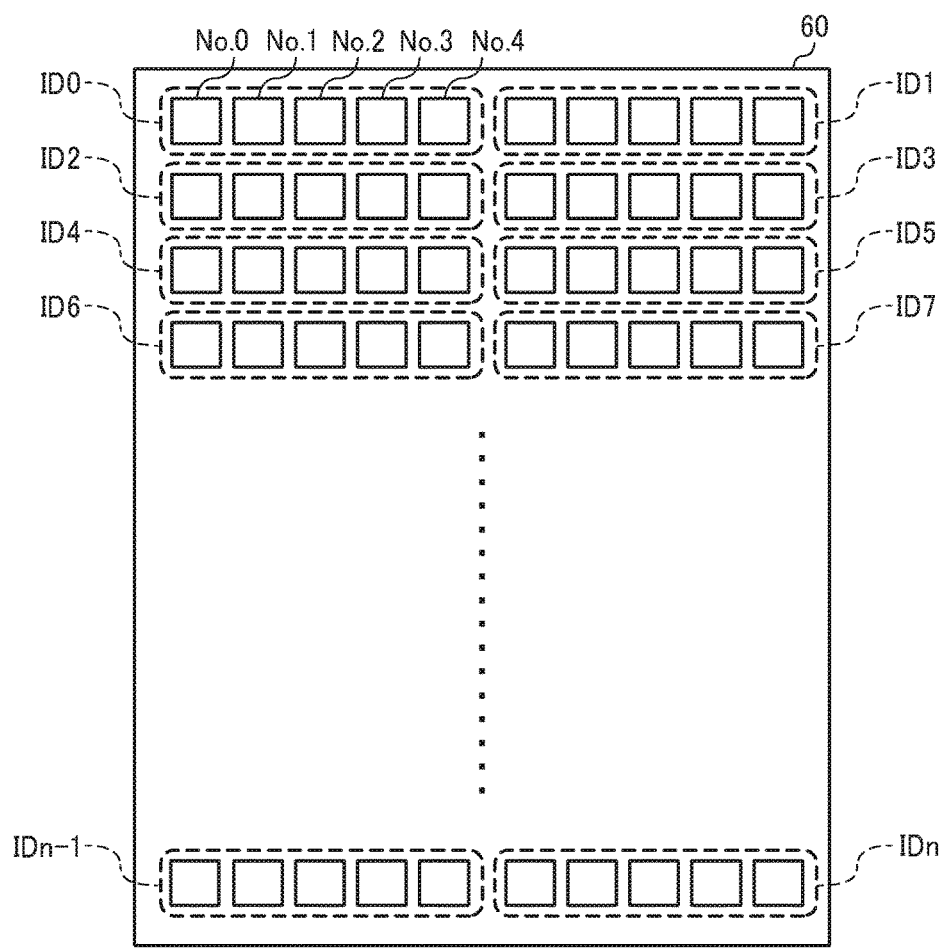
FIG. 6 is a chart illustrating an example of correction patch group corresponding to a particular correction control point.
FIG. 7 is a chart illustrating an example of a color chart for correction.

FIG. 6 is a chart illustrating an example of a plurality of patches (herein referred to as "correction patch set") generated for a particular correction control point. In this example, a correction patch set including five patches is generated for each correction control point.

Each of HSLK values of the patches numbered "0" to "4" illustrated in FIG. 6 represents a color value, in the HSL space, of the correction patch set output for a particular correction control point.

The color chart generation process begins with the conversion of CMY values associated with a correction control point, into HSL values, as described above (step S201 of FIG. 5). The values given in the row of patch number 0 (H0, S0, L0) are the results of the conversion in the hue, saturation, and lightness (luminance) directions converted in the process of S201.

The color value change unit 121 computes, based on the values (H0, S0, L0) resultant from this conversion, color values (H0−α, S0, L0) negatively displaced in the hue direction H by a predetermined rate of displacement α (%), color values (H0+α, S0, L0) positively displaced in the hue direction H by the predetermined rate of displacement α (%), color values (H0, S0+β, L0) positively displaced in the saturation direction S by a predetermined rate of displacement β (%), and color values (H0, S0-β, L0) negatively displaced in the saturation direction S by the predetermined rate of displacement β (%).

The second color converter 122 then reversely converts the HSL values that have been displaced at step S202 into CMY values (step S203 of FIG. 5). The value of K0 is the original K value of that correction control point.

Thus, the five patches numbered "0" to "4" are generated each containing the color value set resultant from the reverse conversion from HSL values illustrated in FIG. 6 into CMY values, and also containing the original K value. These five patches constitute a patch group for correction, corresponding to a particular correction control point.

FIG. 7 is a chart illustrating an example of the color chart 60 for correction. The color chart 60 for correction is formed of patch groups (each group including patches numbered "0" to "4") for correction, respectively corresponding to the correction control points (ID0 to IDn). Since the present embodiment assumes that one patch group for correction, corresponding to a particular correction control point is formed of five patches (i.e., four patches generated by conversion from CMY values to HSL values, followed by displacement of the H and S values, and reverse conversion from the HSL values to CMY values; and an unchanged patch), the total number of patches arranged in the color chart 60 for correction equals the product of "the number of correction control points"×5.

Correction Parameter Generator

The correction parameter generator 13 will next be described in detail below. FIG. 8 is a flowchart illustrating an example of the correction parameter generation process performed by the correction parameter generator 13.

At step S301, the correction parameter generator 13 obtains colorimetric values of the patch group for correction, corresponding to a particular correction control point via the controller 30. These colorimetric values are results of colorimetry by the colorimeter 50.

At step S302, the correction parameter generator 13 obtains CMYK values (first device-dependent color space value). These CMYK values are a set of first device-dependent color space of the correction control point.

At step S303, the correction parameter generator 13 reads the output profile 21 in the memory device 20, and converts the CMYK values into L*a*b* values, which are device-independent color values.

At step S304, the correction parameter generator 13 computes the distance between the point representing the values resultant from the conversion, L*a*b* values (hereinafter referred to as "candidate point"), and the plane formed by the points representing the colorimetric values, L*a*b* values (hereinafter referred to as "colorimetric value points") of the patch group for correction, and determines whether the candidate point is the closest point (L*a*b* values). The process of finding the closest point will be described later herein.

When the correction parameter generator 13 determines that the candidate point is not the closest point (No at step S304), the process proceeds to step S305, where the correction parameter generator 13 adjusts the CMYK values, which are a set of first device-dependent color space values. Specifically, if the lightness is higher than the lightness of the plane formed by the colorimetric value points of the patch group for correction, the CMYK values are increased (in the direction to decrease the lightness), while if the lightness is lower than the lightness of the plane formed by the colorimetric value points of the patch group for correction, the CMYK values are decreased (in the direction to increase the lightness) thus to make an adjustment. After the adjustment is performed at step S305, the process returns to step S303. The steps S303 to S305 are repeated until the closest point is found.

If the closest point is found (Yes at step S304), the process proceeds to step S306, where the correction parameter generator 13 calculates weights for use in interpolation of the CMYK values of the patch group for correction, based on the colorimetric values (L*a*b* values) of the patch group for correction and on the closest point (L*a*b* values).

At step S307, the correction parameter generator 13 obtains the CMYK values (first device-dependent color space values) of the patch group for correction obtained by the colorimetry. At step S308, the correction parameter generator 13 interpolates the CMYK values of the patch group for correction, obtained at step S307, using the weights calculated at step S306 to obtain output values of the correction parameter.

At step S309, the correction parameter generator 13 assigns the CMYK values of the correction control point after the adjustment as the input values, and assigns the CMYK values of the patch group for correction after the interpolation as the output values, thus to generate the correction parameter.

At step S310, it is determined whether the input/output values of the correction parameter have been assigned for all the correction control points. If there is any correction control point to which no input/output values are assigned yet (No at step S310), the process returns to step S301 to process a next correction control point. Otherwise, if all the correction control points already have the input/output values assigned (Yes at step S310), the correction parameter generation process completes.

Figure 9A:
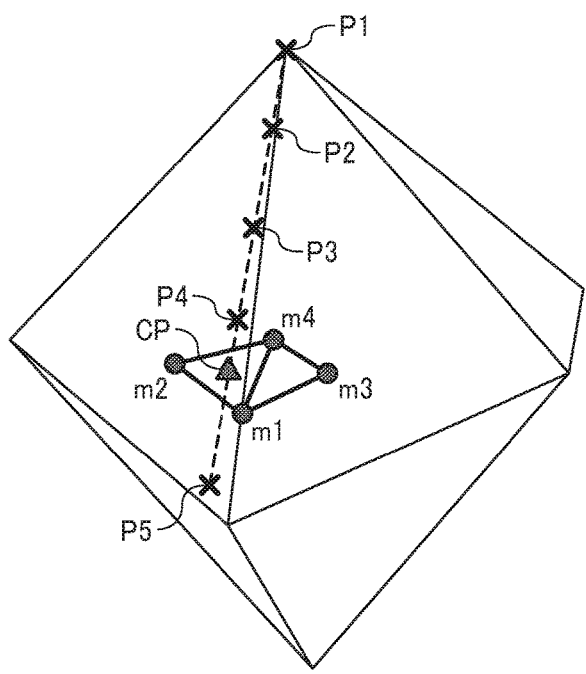
FIGS. 9A and 9B are schematic views of an L*a*b* color space and a partial enlarged view of the L*a*b* color space.
Figure 9B:
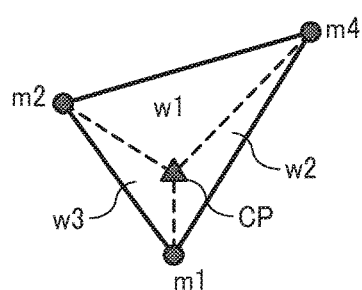

The correction parameter generation process described above will be described in more detail referring to FIGS. 9A and 9B. FIGS. 9A and 9B are schematic views of the L*a*b* color space. In FIGS. 9A and 9B, an enlarged view of a region including the closest point CP and colorimetric value points m1, m2, and m4 of the patch group for correction, surrounding the closest point CP, is also illustrated.

In FIGS. 9A and 9B, the points P1 to P5 each represent a point representing the L*a*b* values obtained, using the output profile 21, by conversion (step S303 of FIG. 8) of the CMYK values of the corresponding correction control point. The colorimetric value points m1 to m4 represent the colorimetric values of the patch group for correction, corresponding to the correction control point P4. Note that, in the example illustrated in FIGS. 9A and 9B, the saturation value S of the correction control point P4 is largest, and accordingly illustrated in FIGS. 9A and 9B are the colorimetric values of four patches excluding the patch having the saturation value S that has been positively displaced (i.e., the patch numbered "3" in the example of FIG. 6). In addition, since the colorimetric value points m1 to m4 have been displaced while the lightness (luminance) is maintained constant, the values of the lightness in the L*a*b* color space are close to one another, thereby making the plane formed by the points representing the colorimetric values nearly perpendicular to the lightness axis (L* axis).

In this example, first determined is an equation that expresses the planes formed by the colorimetric value points m1 to m4 of the patch group for correction. An equation expressing a three-dimensional plane can be uniquely specified by three different points. It is assumed here that these three points are determined such that the original patch colorimetric values remain constant, and that one of the patches having the hue value H displaced, and one of the patches having the saturation value S displaced, are selected.

Since the patch group for correction is generated by changing the hue value H both positively and negatively, and the saturation value S both positively and negatively, 2×2=4 planes are usually formed. However, in the example of FIGS. 9A and 9B, the saturation value S has only been negatively changed, and therefore, the planes are formed in two combinations of "m1, m2, and m4" and "m1, m3, and m4."

Next, color conversion is performed using the output profile 21 while moving the point representing the CMYK values from the point P4 to the point P5 to obtain the L*a*b* values. In this process (steps S303 to S305 of FIG. 8), the distance between the point representing the L*a*b* values and the plane is computed each time to determine the point having the minimum distance (closest point CP). The CMYK values at the minimum distance are set as the input values of the correction parameter (step S309 of FIG. 8).

When the closest point CP is determined, the L*a*b* values of the closest point CP and the L*a*b* values of the colorimetric value points (in this example, m1, m2, and m4) of the patches surrounding the closest point CP are obtained as illustrated in the enlarged view of FIGS. 9A and 9B.

Then, as illustrated in the enlarged view of FIGS. 9A and 9B, auxiliary lines are drawn from the closest point CP respectively to the colorimetric value points m1, m2, and m4 of the patches to make a division into three regions: a region defined by the points CP, m2, and m4; a region defined by the points CP, m1, and m4; and a region defined by the points CP, m1, and m2. Next, the areas w1, w2, and w3 of these divided regions are computed to use these areas w1, w2, and w3 as weights for the interpolation operation (step S306 of FIG. 8).

Next, the CMY values (C1, M1, Y1), (C2, M2, Y2), and (C3, M3, Y3) are obtained for the colorimetric value points m1, m2, and m4 of the patches surrounding the closest point CP (step S307 of FIG. 8). The interpolation operation is then performed using the weights w1, w2, and w3 and using equations 31 to 33 given in Formula 3 (step S308 of FIG. 8) to compute the output (CMY) values of the correction parameter (step S309 of FIG. 8). Since the color value of K remains unchanged in the patches, the original K value is set as the output K value without change.

Formula 3

$$C = (C1 \times w1 + C2 \times w2 + C3 \times w3)/(w1+w2+w3) \quad \text{Equation 31}$$

$$M = (M1 \times w1 + M2 \times w2 + M3 \times w3)/(w1+w2+w3) \quad \text{Equation 32}$$

$$Y = (Y1 \times w1 + Y2 \times w2 + Y3 \times w3)/(w1+w2+w3) \quad \text{Equation 33}$$

FIG. 10 illustrates an example of the values of the correction parameter generated in the correction parameter generation process described above. FIG. 10 illustrates the correction parameter in two sections of input values (INPUT) and output values (OUTPUT) arranged in rows respectively associated with the correction control points (ID0 to IDn). Note that the input values are different from the values illustrated in FIG. 3 due to the adjustment process of the CMYK values during searching the closest points (see S305 of FIG. 8, and FIGS. 9A and 9B).

Output Profile Correction Unit

Figure 11:
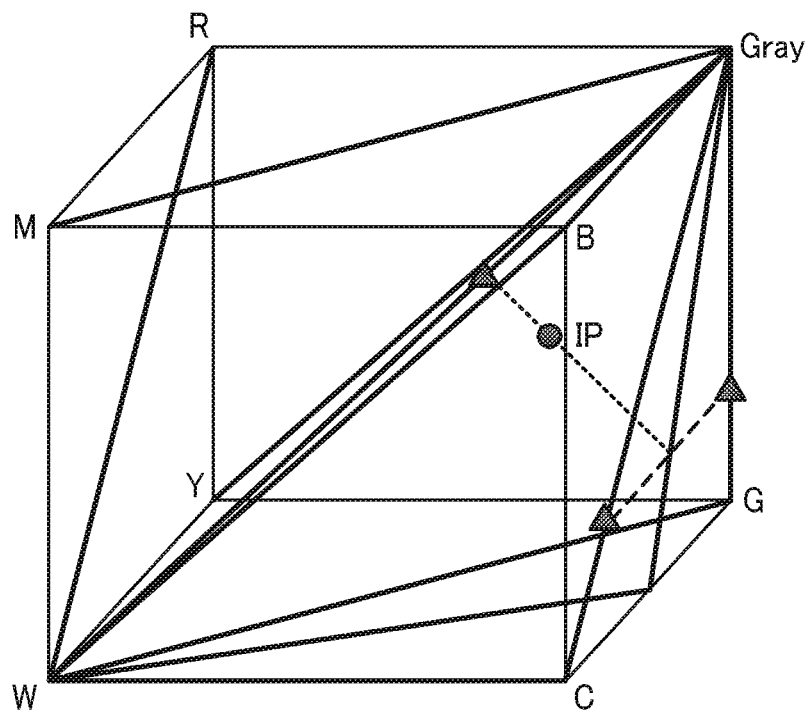
FIG. 11 is a schematic view of a CMY color space.

The output profile correction unit 14 will next be described in detail below. The output profile correction process performed by the output profile correction unit 14 will be described in detail below referring to FIG. 11. FIG. 11 is a schematic view of a color space in a coordinate system having x-axis representing the C color value, y-axis representing the M color value, and z-axis representing the Y color value. Thus, in FIG. 11, the origin at the bottom left corner represents white color (W) and the top right corner represents gray color (Gray) at CMY 100%.

Assuming that the correction control points are assigned to sets of typical hues, including primary colors such as CMY, secondary colors such as RGB, and tertiary colors such as gray, correction parameters are generated respectively associated with six lines from the vertex W to the vertex Gray through the vertices C, M, Y, R, G, and B, and with the diagonal from the vertex W to the vertex Gray (hereinafter referred to as "W-Gray line").

The output profile correction process begins with obtaining of the CMYK values of a particular grid point from a look-up table (LUT) of the output profile 21 that is to be corrected. In some profiles, such as an ICC profile, gamma conversion, matrix conversion, or other similar operation can be added before or after the LUT. This configuration may require reverse conversion to generate a correct output if gamma conversion, matrix conversion, or other similar operation is to be performed.

Using the CMY values of the CMYK values obtained, a determination is made of the region of the CMY color space in which that point is included, based on the magnitude relationship between the CMY values. Based on the determination result, the correction parameter to be used is determined. For example, assume a case of the grid point IP illustrated in FIG. 11, the magnitude relationship is C>M>Y, and therefore the correction parameters for the C hue, the G hue, and the W-Gray line are used.

Corrected values are computed using these three correction parameters as follows. First, the CMY values are converted into the HSL values. Next, with respect to the HSL values obtained by the conversion, the saturation value S is corrected to "1," and the hue value H is then corrected to the hue value at the vertex C (hereinafter referred to as "vertex C hue value") and to the hue value at the vertex G (hereinafter referred to as "vertex G hue value").

The HSL values after the correction are then reversely converted into CMY values, to which the correction parameters are applied. The correction operation using a correction parameter is performed as follows. The input values of the correction parameters of the applicable control lines are searched for the pair of value sets interposing the CMY values to be corrected between the value sets.

The corresponding pair of output value sets are then determined and obtained. At least one of various interpolation methods, such as linear interpolation and spline interpolation, is then applied, and the CMY values after correction are output.

In addition, the sets of CMY values that have been obtained by the correction respectively using the vertex C hue value and the vertex G hue value are weight-interpolated by ratios in association with the difference between the original hue value H and the vertex C hue value $H_c$, and with the difference between the original hue value H and the vertex G hue value $H_g$ (equations 34 to 36 given in Formula 4). As used herein, the symbols $C_g$, $M_g$, and $Y_g$ respectively denote the CMY values obtained by the correction using the vertex G hue value, while the symbols $C_c$, $M_c$, and $Y_c$ respectively denote the CMY values obtained by the correction using the vertex C hue value.

Formula 4

$$C_{S=1} = (|H-H_c| \times C_g + |H-H_g| \times C_c)/|H_g - H_c| \quad \text{Equation 34}$$

$$M_{S=1} = (|H-H_c| \times M_g + |H-H_g| \times M_c)/|H_g - H_c| \quad \text{Equation 35}$$

$$Y_{S=1} = (|H-H_c| \times Y_g + |H-H_g| \times Y_c)/|H_g - H_c| \quad \text{Equation 36}$$

Then, after correction of the saturation value S to "1," correction is similarly performed using the correction parameter for the W-Gray line to obtain the values $C_{S=0}$, $M_{S=0}$, and $Y_{S=0}$. Finally, interpolation is performed for the saturation value S based on the values $C_{S=1}$, $M_{S=1}$, $Y_{S=1}$, $C_{S=0}$, $M_{S=0}$, and $Y_{S=0}$ to obtain the ultimate, corrected CMY values (equations 37 to 39 given in Formula 5).

Formula 5

$$C = \{(1-S) \times C_{S=0} + S \times C_{S=1}\} \quad \text{Equation 37}$$

$$M = \{(1-S) \times M_{S=0} + S \times M_{S=1}\} \quad \text{Equation 38}$$

$$Y = \{(1-S) \times Y_{S=0} + S \times Y_{S=1}\} \quad \text{Equation 39}$$

The value of K is the original K value before correction. The output profile correction process described above is repeated for all the grid points contained in the LUT.

In the correction process of an output profile, the image processing apparatus according to the present embodiment as described above converts color values (CMYK values) in a first device-dependent color space (e.g., CMYK color space) of an output device into color values (HSL values) in a second device-dependent color space (e.g., HSL color space represented by lightness (luminance), saturation, and hue) of the output device, and then displaces the color values by predetermined second device-dependent color space values to generate and output a color patch containing these color values displaced, and then computes target color values in the first device-dependent color space by interpolation using colorimetric values of the color patch and device-independent target color values (L*a*b* values). This process can improve correction accuracy of the output profile. In other words, this process can generate patches of color values displaced in a color space capable of better maintaining uniformity in lightness compared with the CMYK color space, thereby improving interpolation accuracy in the lightness direction in the output profile.

Embodiment 2

A description is given of an image processing apparatus according to another embodiment. Note that redundant descriptions are omitted of aspects identical to those of the embodiment described above, unless otherwise required.

Embodiment 1 has been described as including the color chart generator 12 that converts CMY values into HSL values, and displaces the HSL values by predetermined amounts to generate a patch. However, a color near gray is less responsive to a change in HSL values, and it is difficult to generate a suitable patch through adjustment of color values within a suitable range.

Thus, the image processing apparatus 1 of Embodiment 2 is configured to change the patch in the CMYK color space for an achromatic range to obtain more suitable values for the correction parameter.

Figure 12:
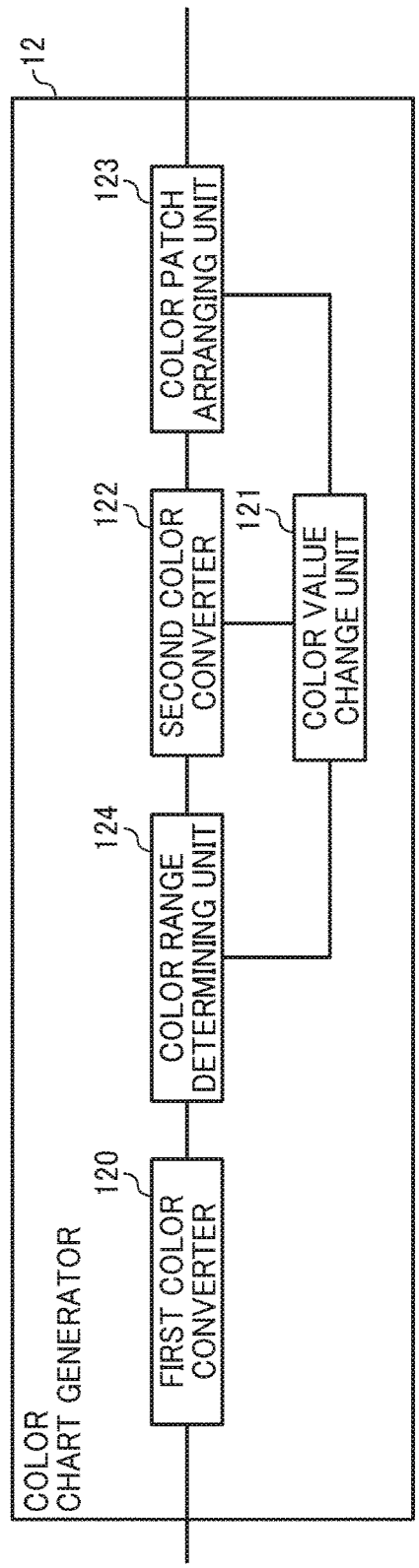
FIG. 12 is a block diagram illustrating another example configuration of the color chart generator.

FIG. 12 is a block diagram illustrating another example configuration of the color chart generator 12. The color chart generator 12 according to the present embodiment includes the first color converter 120, a color range determining unit 124, the second color converter 122, the color value change unit 121, and the color patch arranging unit 123. The color chart generator 12 generates the color chart 60 for correction based on correction control points assigned. This process is herein referred to as color chart generation process.

The color range determining unit 124 determines whether a color point associated with a particular set of HSL values converted by the first color converter 120 belongs to a chromatic range or to an achromatic range.

The operation of the color value change unit 121 depends on the result of determination by the color range determining unit 124. If the result of determination indicates a chromatic range, the color value change unit 121 displaces the HSL values by respective applicable predetermined values. If the result of determination indicates an achromatic range, the color value change unit 121 displaces the CMYK values by respective applicable predetermined values.

Figure 13:
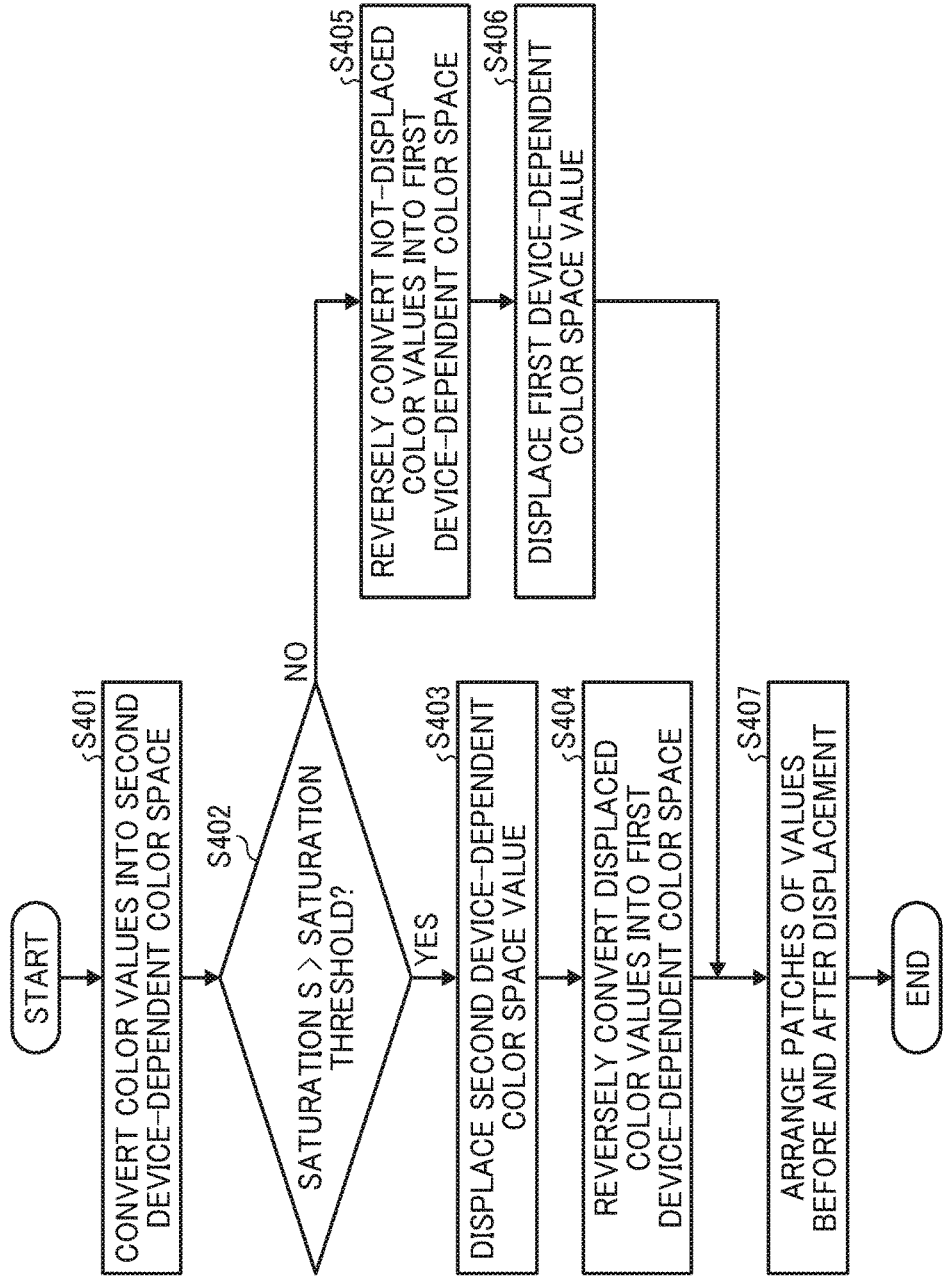
FIG. 13 is a flowchart illustrating another example of the color chart generation process.

FIG. 13 is a flowchart illustrating an example of a color chart generation process performed by the color chart generator 12 in Embodiment 2.

The color chart generation process according to Embodiment 2 begins at step S401, where the first color converter 120 converts CMY values (in the first device-dependent color space) of each of correction control points into HSL values (in the second device-dependent color space). The CMY values are converted into the HSL values using the equations given in Formula 1.

At step S402, the color range determining unit 124 determines whether the saturation value S after the conversion is greater than a predetermined threshold (saturation threshold). The predetermined threshold is preferably a relatively small value (e.g., S=0.1) so that the range where suitable patch adjustment is difficult will be selected in the displacing operation of the HSL values by the color value change unit 121.

If the color range determining unit 124 determines that the saturation value S is greater than the predetermined threshold (Yes at step S402), that is, that point is in a chromatic range, the color value change unit 121 displaces, at step S403, the HSL values resultant from the conversion by the predetermined value similarly to the process in Embodiment 1.

At step S404, the second color converter 122 reversely converts the HSL values displaced at step S403, into CMY values (in the first device-dependent color space). The HSL values can be converted into the CMY values using the equations given in Formula 2 presented above. In the color chart generation process, the value of K can be the original value without change.

By contrast, when the saturation value S is determined to be less than or equal to the predetermined threshold (No at step S402), that is, that point is in an achromatic range, the second color converter 122 reversely converts, at step S405, the HSL values converted at step S401 (not displaced), into CMY values in the first device-dependent color space. The HSL values can be converted into the CMY values using the equations given in Formula 2 presented above.

At step S406, the color value change unit 121 displaces the CMY values resultant from the conversion by the predetermined value. In the color chart generation process, the value of K can be the original value without change.

At step S407 after steps S404 or S406, the color patch arranging unit 123 arranges, on a page, a patch generated using the color value sets before and after the displacing made by the color value change unit 121 to generate the color chart 60 for correction.

FIG. 14 is a chart illustrating an example of a plurality of patches (herein referred to as "patch group for correction")

generated for a particular correction control point in an achromatic range. In this example, a patch group for correction including nine patches is generated for each correction control point.

A value of the patches numbered "0" to "8" illustrated in FIG. 14 represents a color value, in the CMYK space, of the patch group for correction output for a particular correction control point (one of ID0 to IDn).

The color chart generation process proceeds as follows. As described above, CMY values of that correction control point are converted into HSL values (step S401 illustrated in FIG. 13). Then, it is determined whether the correction control point belongs to a chromatic range or to an achromatic range (step S402 illustrated in FIG. 13). In a case of achromatic range, the HSL values are reversely converted into CMY values (step S405 illustrated in FIG. 13), and then, the CMY values are displaced (step S406 illustrated in FIG. 13).

The CMY values given in the row of patch number 0 (C0, M0, and Y0) are the results of the reverse conversion into the CMY values performed at step S405. The value of K0 is the original K value.

The color value change unit 121 displaces the M and Y components among C0, M0, Y0, and K0 of each of the correction control points positively or negatively by a predetermined amount α (1 to 255). In the example illustrated in FIG. 14, nine patches are generated in total, including eight patches that have at least one of the M and Y components displaced either positively or negatively by the amount of displacement α (patches numbered "1" to "8"), and the patch having the original values (patch numbered "0"). These nine patches constitute a patch group for correction, corresponding to a particular correction control point in an achromatic range.

The correction parameter generation process for an achromatic range will next be described in detail below referring to FIGS. 15A and 15B. FIGS. 15A and 15B are schematic views of the L*a*b* color space. FIGS. 15A and 15B are enlarged views of a region including a closest point CP2 and colorimetric value points m10, m11, and m12 of the patch group for correction, surrounding the closest point CP2.

In FIGS. 15A and 15B, the points P11 to P15 each represent a point representing the L*a*b* values obtained, using the output profile 21, by conversion of CMYK values of the corresponding correction control point. The colorimetric value points m10 to m18 represent the colorimetric values of the patch group for correction, corresponding to the correction control point P13.

The input values and output values of a correction parameter are computed similarly to the displacement operation performed in the HSL color space, as follows. Three points (m10, m11, and m12) are selected from the colorimetric value points to form a three-dimensional plane.

Next, color conversion is performed using the output profile 21 while moving the point representing the CMYK values from the point P13 toward the point P14 to obtain the L*a*b* values. In this process, the distance between the point representing the L*a*b* values and the plane is computed each time to determine the closest point CP2 having the minimum distance. The CMYK values at the minimum distance are set as the input values of the correction parameter (step S309 of FIG. 8).

When the closest point CP2 is determined, the L*a*b* values of the closest point CP2 and the L*a*b* values of the colorimetric value points (m10, m11, and m12) of the patches surrounding the closest point are obtained as illustrated in the enlarged view illustrated in FIGS. 15A and 15B.

Then, as illustrated in the enlarged view illustrated in FIGS. 15A and 15B, auxiliary lines are drawn from the closest point CP2 respectively to the colorimetric value points m10, m11, and m12 of the patches to make a division into three regions: a region defined by the points CP2, m11, and m12; a region defined by the points CP2, m10, and m12; and a region defined by the points CP2, m10, and m11. Next, the areas w1, w2, and w3 of these divided regions are computed to use these areas w1, w2, and w3 as weights for the interpolation operation.

Next, the CMY values of the colorimetric value points m10, m11, and m12 of the patches surrounding the closest point CP2 are obtained, and an interpolation operation is then performed using the weights w1, w2, and w3 similarly to the computation operations given in Formula 3 to compute the output (CMY) values of the correction parameter. Since the color value of K remains unchanged in the patches, the original K value is set as the output K value without change.

As described above, the image processing apparatus according to Embodiment 2 uses patch groups resultant from displacement of the CMYK color values in a case of an achromatic range, and uses patch groups resultant from displacement of the HSL color values in a case of a chromatic range. This operation enables generation of a patch that contains color values displaced within a suitable range also in an achromatic range, thereby obtaining a more suitable correction parameter.

Embodiment 3

During generation of patches of displaced color values, when the rate of displacement is identical in the entire color space, the following inconveniences may arise. The amount of displacement may be insufficient in a high lightness (luminance) range, a low lightness (luminance) range, or a low saturation range. By contrast, the mount of displacement may be excessive in a medium lightness (luminance) range or a high saturation range.

Thus, the image processing apparatus 1 according to Embodiment 3 is capable of changing the amount of displacement depending on the range, rather than using a constant rate of displacement in the entire color space.

Figure 16:
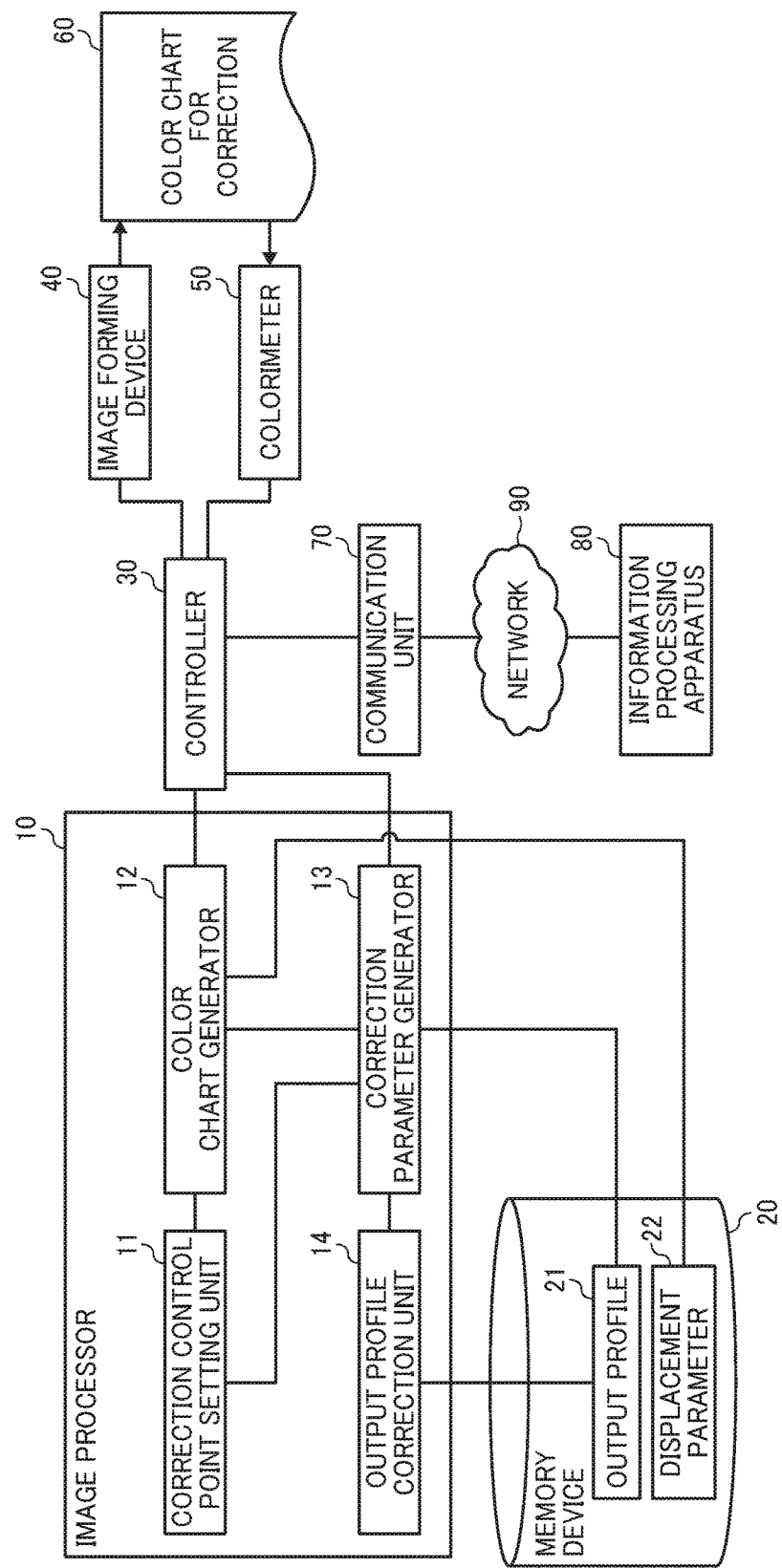
FIG. 16 is a block diagram schematically illustrating another example configuration of the image processing apparatus.

FIG. 16 is a schematic block diagram of an image processing apparatus according to Embodiment 3. The image processing apparatus 1 according to Embodiment 3 includes the image processor 10, the memory device 20, the controller 30, the image forming device 40, the colorimeter 50, and the communication unit 70 similar to Embodiments 1 and 2. The image processing apparatus 1 according to Embodiment 3 differs from the image processing apparatus 1 according to Embodiments 1 and 2 in that the memory device 20 stores, not only the output profile 21, but also a displacement parameter 22.

The displacement parameter 22 specifies an amount of displacement (predetermined amount of displacement) of an HSL value to be changed by the color value change unit 121. The displacement parameter 22 has predetermined values respectively depending on the difference between the maximum value and the minimum value of the CMY values.

Figure 17:
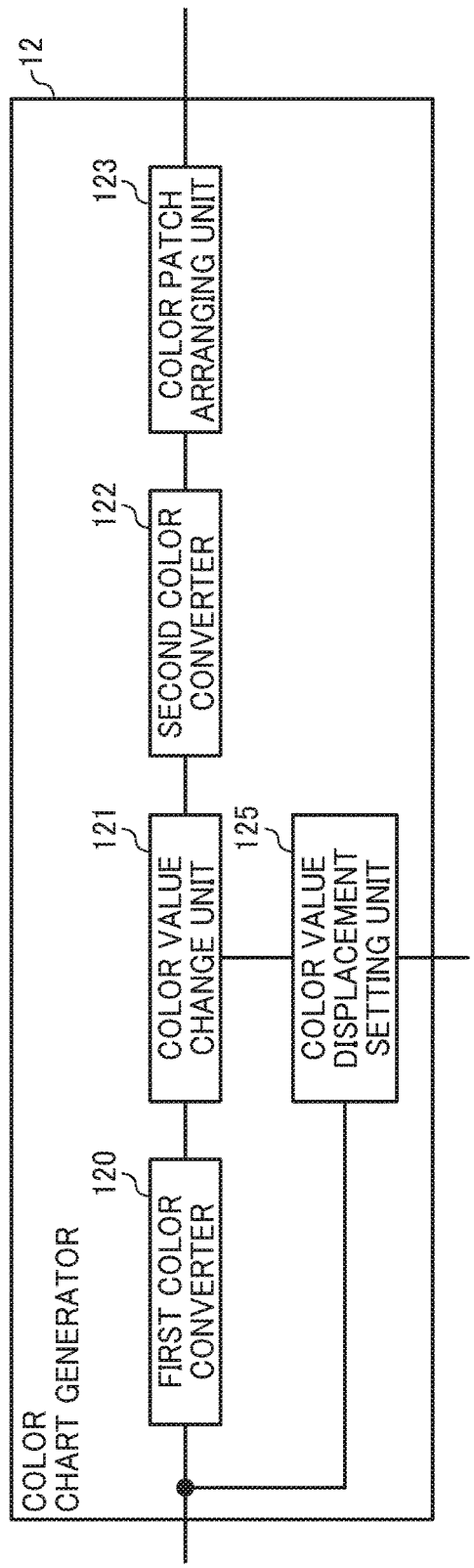
FIG. 17 is a block diagram illustrating still another example configuration of the color chart generator.

FIG. 17 is a block diagram illustrating another example configuration of the color chart generator 12. The color chart generator 12 according to the present embodiment includes the first color converter 120, the color value change unit 121, a color value displacement setting unit 125, the second color converter 122, and the color patch arranging unit 123. The color chart generator 12 generates the color chart 60 for correction based on the correction control points assigned. This process is herein referred to as color chart generation process.

The color value displacement setting unit 125 refers to the values of the displacement parameter 22 stored in the memory device 20, acquires the values of the parameter representing the amounts of displacement, and sets the values depending on the CMYK values.

Figures 18, 19:
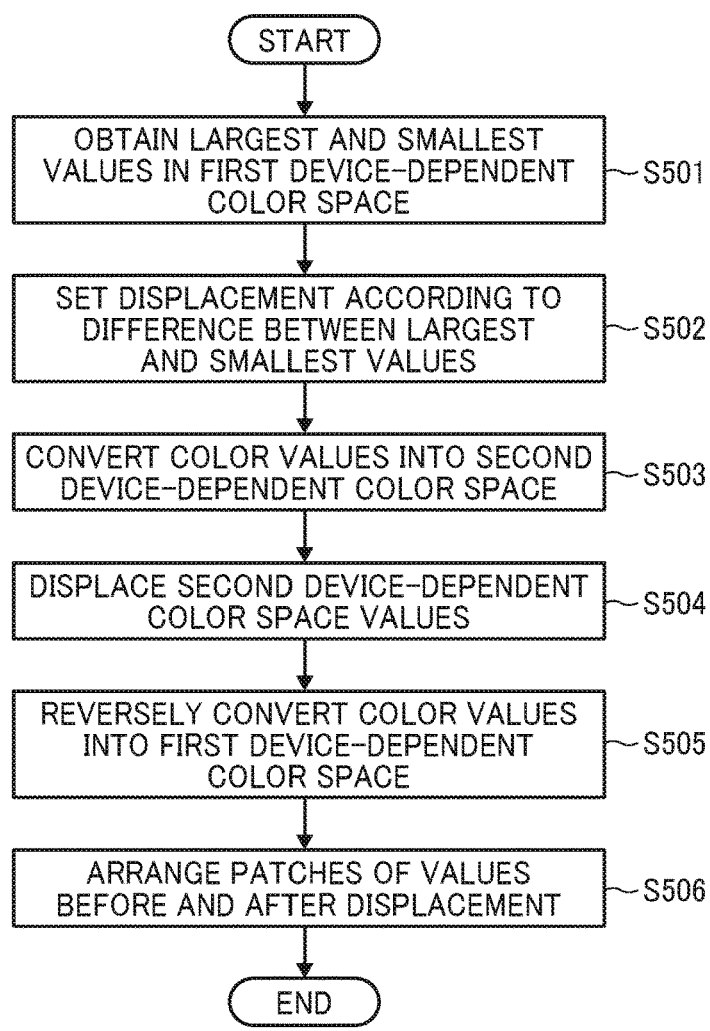
FIG. 18 is a flowchart illustrating still another example of the color chart generation process.
FIG. 19 is a chart illustrating an example of displacement parameter.

FIG. 18 is a flowchart illustrating an example of the color chart generation process performed by the color chart generator 12 in Embodiment 3.

The color chart generation process according to Embodiment 3 begins at step S501, where the color value displacement setting unit 125 acquires the largest value and the smallest value of the CMY values of the CMYK values in the first device-dependent color space. At step S502, the color value displacement setting unit 125 computes the difference between the largest value and the smallest value, and outputs an amount of displacement based on the difference.

FIG. 19 illustrates an example of the values of the displacement parameter 22. The displacement parameter 22 provides a correction rate dependent on the difference between the largest value and the smallest value (Max−Min) of the CMY values. The displacement parameter 22 preferably provides a higher rate of displacement for a smaller difference between the largest value and the smallest value, that is, for a region of lower lightness (luminance), higher lightness (luminance), and lower saturation, and preferably provides a lower rate of displacement for a larger difference between the largest value and the smallest value, that is, for a region of more central lightness (luminance), and higher saturation. Note that the displacement parameter 22 illustrated in FIG. 19 is merely an example, and can also be defined in smaller steps with respect to the value Max−Min.

At step S503, the first color converter 120 converts CMY values (in the first device-dependent color space) of each of the correction control points into HSL values (in the second device-dependent color space). The CMY values are converted into the HSL values using the equations given in Formula 1.

At step S504, the color value change unit 121 displaces, by the predetermined values, the HSL values resultant from the conversion performed using the equations given in Formula 1 presented above. The predetermined values used in this process are the amounts of displacement output from the color value displacement setting unit 125.

At step S505, the second color converter 122 reversely converts the HSL values displaced at step S504 into CMY values. The HSL values can be converted into the CMY values using the equations given in Formula 2 presented above. In the color chart generation process, the value of K can be the original value without change.

At step S506, the color patch arranging unit 123 arranges, on a page, a patch generated using the color value sets before and after the displacing made by the color value change unit 121 to generate the color chart 60 for correction.

The image processing apparatus 1 according to Embodiment 3 as described above is capable of changing the amount of displacement depending on the range. Therefore, patches of suitable amount of displacement can be generated for each range, thereby obtaining a more suitable correction parameter.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above. The methods described above can be provided as program codes stored in a recording medium, to cause a processor to execute the method when executed by at least one processor.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus comprising:
   a processor including:
      a correction control point setting unit configured to assign a correction control point to a first color-space value in a first color space dependent on a first output device; and
      a color chart generator configured to:
         convert the first color-space value to which the correction control point is assigned into a second color-space value in a second color space dependent on a second output device, the second color space different from the first color space;
         displace the second color-space value by a predetermined amount;
         convert a displaced second color-space value into a displaced first color-space value in the first color space; and
         generate a color chart including a plurality of patches including a displaced-value patch generated based on the displaced first color-space value;
   an image forming device to output the color chart; and
   a colorimeter to perform colorimetry of the plurality of patches of the color chart,
   the processor further including:
      a correction parameter generator configured to generate a correction parameter to correct an output profile with a colorimetric value generated by the colorimeter; and
      an output profile correction unit to correct the output profile using the correction parameter.

2. The image processing apparatus according to claim 1, wherein the color chart generator includes:
   a first color converter configured to convert the first color-space value into the second color-space value; and
   a color value displacing unit to displace the second color-space value at a predetermined rate; and
   a second color converter configured to convert the second color-space value into the first color-space value in the first color space,
   wherein the plurality of patches further includes a patch generated based on the first color-space value that is not displaced by the color value displacing unit.

3. The image processing apparatus according to claim 2, wherein the color chart generator further includes a color range determining unit configured to determine whether the correction control point is in an achromatic color range based on the second color-space value, and
wherein the color value displacing unit is configured to:
displace the first color-space value by the predetermined amount regarding the correction control point determined to be in the achromatic color range, and
displace the second color-space value by the predetermined amount regarding the correction control point determined to be in a chromatic color range.

4. The image processing apparatus according to claim 2, wherein the color chart generator further includes a color value displacement setting unit configured to set the predetermined rate in accordance with the first color-space value, the predetermined rate used by the color value displacing unit.

5. The image processing apparatus according to claim 4, wherein the color value displacement setting unit is configured to set the predetermined rate in accordance with a difference between a largest color value and a smallest color value in the first color space.

6. The image processing apparatus according to claim 1, wherein the correction parameter generator is configured to convert, with the output profile, the first color-space value at the correction control point into a first device-independent color value independent of the first output device and the second output device, and
wherein the correction parameter generator is configured to generate the correction parameter based on:
the first color-space value in the first color space to which the correction control point is assigned,
the first device-independent color value,
the displaced first color-space value based on which the displaced-value patch of the color chart is generated, and
a second device-independent color value representing a colorimetric value of the color chart, generated by the colorimeter.

7. The image processing apparatus according to claim 1, wherein the second color space is an HSL color space.

8. The image processing apparatus according to claim 1, wherein the first color space is a CMYK color space.

9. An image processing method comprising:
assigning a correction control point to a first color-space value in a first color space dependent on a first output device;
converting the first color-space value to which the correction control point is assigned into a second color-space value in a second color space dependent on a second output device, the second color space different from the first color space;
displacing the second color-space value by a predetermined amount;
converting a displaced second color-space value into a displaced first color-space value in the first color space;
generating a color chart including a plurality of patches including a displaced-value patch generated based on the displaced first color-space value;
outputting the color chart;
performing colorimetry of the plurality of patches of the color chart;
generating a correction parameter to correct an output profile with a colorimetric value generated by the colorimeter; and
correcting the output profile using the correction parameter.

10. A non-transitory recording medium storing program codes which, when executed by at least one processor, cause the processor to execute a method, the method comprising:
assigning a correction control point to a first color-space value in a first color space dependent on a first output device;
converting the first color-space value to which the correction control point is assigned into a second color-space value in a second color space dependent on a second output device, the second color space different from the first color space;
displacing the second color-space value by a predetermined amount;
converting a displaced second color-space value into a displaced first color-space value in the first color space;
generating a color chart including a plurality of patches including a displaced-value patch generated based on the displaced first color-space value;
outputting the color chart;
performing colorimetry of the plurality of patches of the color chart;
generating a correction parameter to correct an output profile with a colorimetric value generated by the colorimeter; and
correcting the output profile using the correction parameter.

* * * * *